(12) United States Patent
Miao et al.

(10) Patent No.: US 9,408,153 B2
(45) Date of Patent: Aug. 2, 2016

(54) CONTROLLING A MOBILE DEVICE

(75) Inventors: Honglei Miao, Espoo (FI); Lili Zhang, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/419,856

(22) PCT Filed: Aug. 9, 2012

(86) PCT No.: PCT/IB2012/054064
§ 371 (c)(1),
(2), (4) Date: Jun. 7, 2015

(87) PCT Pub. No.: WO2014/024004
PCT Pub. Date: Feb. 13, 2014

(65) Prior Publication Data
US 2015/0282089 A1 Oct. 1, 2015

(51) Int. Cl.
*H04B 1/38* (2015.01)
*H04W 52/02* (2009.01)

(52) U.S. Cl.
CPC ...... *H04W 52/0254* (2013.01); *H04W 52/0258* (2013.01); *Y02B 60/50* (2013.01)

(58) Field of Classification Search
CPC ............. Y02B 60/50; H04W 52/0219; H04W 52/0245; H04W 52/0258; G06F 1/325
USPC ................. 455/574, 127.5, 343.5, 343.1, 41.2
See application file for complete search history.

(56) References Cited

U.S. PATENT DOCUMENTS

| | | | | |
|---|---|---|---|---|
| 7,764,981 | B2 * | 7/2010 | Kalofonos | H04W 76/046 370/235 |
| 8,332,945 | B2 * | 12/2012 | Kim | G06F 1/28 713/188 |
| 2005/0281270 | A1 | 12/2005 | Kossi et al. | |
| 2008/0108397 | A1 * | 5/2008 | Piipponen | G06F 1/3215 455/574 |
| 2009/0164152 | A1 | 6/2009 | Creus et al. | |
| 2011/0072293 | A1 | 3/2011 | Mazzaferri et al. | |

FOREIGN PATENT DOCUMENTS

| | | |
|---|---|---|
| GB | 2475110 | 5/2011 |
| WO | 2009040787 | 4/2009 |

OTHER PUBLICATIONS

International Search Report and Written Opinion received for corresponding Patent Cooperation Treaty Application No. PCT/IB2012/054064, dated May 24, 2013, 11 pages.

* cited by examiner

*Primary Examiner* — Sonny Trinh
(74) *Attorney, Agent, or Firm* — Ditthavong & Steiner, P.C.

(57) ABSTRACT

A method comprises controlling a mobile device comprising one or more wireless interfaces, one or more applications that require the mobile device to communicate wirelessly, and a database, to perform measuring power consumption during wireless communication in each of a plurality of circumstances in which one or more conditions are present for plural combinations of the one or more applications, and the one or more wireless interfaces and/or available access points, for each measurement of power consumption, recording in the database the measured power consumption (4.5) along with: information on the associated one or more conditions, and indicators identifying the one of the one or more applications and the one of the one or more wireless interfaces and/or access points (4.1), detecting a requirement of a first one of the one or more applications for wireless communication (4.2), utilizing the database and information on current conditions to identify the wireless interface and/or access point that might be expected to cause the lowest power consumption (4.3), and using the identified interface and/or access point to allow the first application to communicate wirelessly (4.4).

20 Claims, 4 Drawing Sheets

Fig. 1

| time | application | wireless interface | access point | Latitude (°N) | Longitude (°W) | radius of uncertainty (m) | power usage (mW) |
|---|---|---|---|---|---|---|---|
| 13:02 | social media app | wifi | coffee_shop_wifi | 51.5171 | 0.10623 | 400 | 559.1 |
| 13:04 | social media app | wifi | library_wifi | 51.5171 | 0.10623 | 400 | 854.3 |
| 13:06 | social media app | cellular | cell_network_A, base station A1 | 51.5171 | 0.10623 | 400 | 750.1 |
| 13:08 | email app | wifi | coffee_shop_wifi | 51.5171 | 0.10623 | 400 | 320.8 |
| 13:10 | browser app | wifi | coffee_shop_wifi | 51.5171 | 0.10623 | 400 | 406.5 |
| 15:27 | browser app | cellular | Cell_Network_B, base station B4 | 51.5171 | 0.10623 | 400 | 684.3 |
| 15:29 | email app | wifi | Office_Wifi | 51.51722 | 0.10618 | 65 | 381.3 |
| 15:31 | email app | cellular | Cell_Network_A, base station A9 | 51.51722 | 0.10618 | 65 | 711.3 |
| 15:33 | email app | bluetooth | Office_Bluetooth, access point 2 | 51.51722 | 0.10618 | 65 | 367.4 |

CONTROLLING A MOBILE DEVICE

RELATED APPLICATION

This application was originally filed as PCT Application No. PCT/IB2012/054064 filed Aug. 9, 2012.

FIELD OF THE INVENTION

The invention relates to a method of operating a mobile communications device, and to a mobile communications device. In particular, although not exclusively, it relates to reducing power consumption associated with wireless data communication of a mobile device.

BACKGROUND OF THE INVENTION

Power consumption on a mobile device associated with wireless data communication by the device is typically a significant factor affecting the battery life of the device.

The invention is made in this context.

SUMMARY OF THE INVENTION

In a first aspect, this specification describes a method comprising controlling a mobile device comprising: one or more wireless interfaces, one or more applications that require the mobile device to communicate wirelessly, and a database, to perform:
  measuring power consumption during wireless communication in each of a plurality of circumstances in which one or more conditions are present for plural combinations of the one or more applications, and the one or more wireless interfaces and/or available access points;
  for each measurement of power consumption, recording in the database the measured power consumption along with: information on the associated one or more conditions, and indicators identifying the one of the one or more applications and the one of the one or more wireless interfaces and/or access points;
  detecting a requirement of a first one of the one or more applications for wireless communication;
  utilising the database and information on current conditions to identify the wireless interface and/or access point that might be expected to cause the lowest power consumption; and
  using the identified interface and/or access point to allow the first application to communicate wirelessly.

In a second aspect, this specification describes apparatus comprising at least one processor and at least one memory including computer program code, the at least one memory and the computer program code configured to, with the at least one processor, cause the apparatus to control a mobile device comprising one or more wireless interfaces, one or more applications that require the mobile device to communicate wirelessly, and a database:
  to measure power consumption during wireless communication in each of a plurality of circumstances in which one or more conditions are present for plural combinations of the one or more applications and the one or more wireless interfaces and/or available access points;
  for each measurement of power consumption, to record in the database the measured power consumption along with: information on the associated one or more conditions, and indicators identifying the one of the one or more applications and the one of the one or more wireless interfaces and/or access points;
  to detect a requirement of a first one of the one or more applications for wireless communication;
  to utilise the database and information on current conditions to identify the wireless interface and/or access point that might be expected to cause the lowest power consumption; and
  to use the identified interface and/or access point to allow the first application to communicate wirelessly.

In a third aspect, this specification describes a mobile device comprising the apparatus of the second aspect, one or more wireless interfaces, one or more applications that require the mobile device to communicate wirelessly, and a database.

In a fourth aspect, this specification describes computer-readable instructions which, when executed by computing apparatus, cause the computing apparatus to perform the method of the first aspect.

In a fifth aspect, this specification describes at least one non-transitory computer-readable medium having computer readable instructions stored thereon, the computer readable instructions, when executed by at least one processor, causing the at least one processor to control a mobile device comprising one or more wireless interfaces, one or more applications that require the mobile device to communicate wirelessly, and a database:
  to measure power consumption during wireless communication in each of a plurality of circumstances in which one or more conditions are present for plural combinations of the one or more applications and the one or more wireless interfaces and/or available access points;
  for each measurement of power consumption, to record in the database the measured power consumption along with: information on the associated one or more conditions, and indicators identifying the one of the one or more applications and the one of the one or more wireless interfaces and/or access points;
  to detect a requirement of a first one of the one or more applications for wireless communication;
  to utilise the database and information on current conditions to identify the wireless interface and/or access point that might be expected to cause the lowest power consumption; and
  to use the identified interface and/or access point to allow the first application to communicate wirelessly.

In a sixth aspect, this specification describes apparatus comprising means for controlling a mobile device comprising: one or more wireless interfaces, one or more applications that require the mobile device to communicate wirelessly, and a database:
  to measure power consumption during wireless communication in each of a plurality of circumstances in which one or more conditions are present for plural combinations of the one or more applications, and the one or more wireless interfaces and/or available access points;
  for each measurement of power consumption, to record in the database the measured power consumption along with: information on the associated one or more conditions, and indicators identifying the one of the one or more applications and the one of the one or more wireless interfaces and/or access points;
  to detect a requirement of a first one of the one or more applications for wireless communication;
  to utilise the database and information on current conditions to identify the wireless interface and/or access point that might be expected to cause the lowest power consumption; and to use the identified interface and/or access point to allow the first application to communicate wirelessly.

In a seventh aspect, this specification describes apparatus comprising:

means for causing measurement of power consumption, by a mobile device comprising one or more wireless interfaces, one or more applications that require the mobile device to communicate wirelessly and a database, during wireless communication in each of a plurality of circumstances in which one or more conditions are present for plural combinations of the one or more applications, and the one or more wireless interfaces and/or available access points;

means for causing recording of, for each measurement of power consumption, the measured power consumption along with: information on the associated one or more conditions, and indicators identifying the one of the one or more applications and the one of the one or more wireless interfaces and/or access points;

means for causing detection of a requirement of a first one of the one or more applications for wireless communication;

means for causing utilisation of the database and information on current conditions to identify the wireless interface and/or access point that might be expected to cause the lowest power consumption; and means for causing utilisation of the identified interface and/or access point to allow the first application to communicate wirelessly.

BRIEF DESCRIPTION OF THE DRAWINGS

Embodiments of the invention will now be described by way of example with reference to the accompanying drawings, of which.

DETAILED DESCRIPTION OF EXAMPLE EMBODIMENTS

Figure 1:
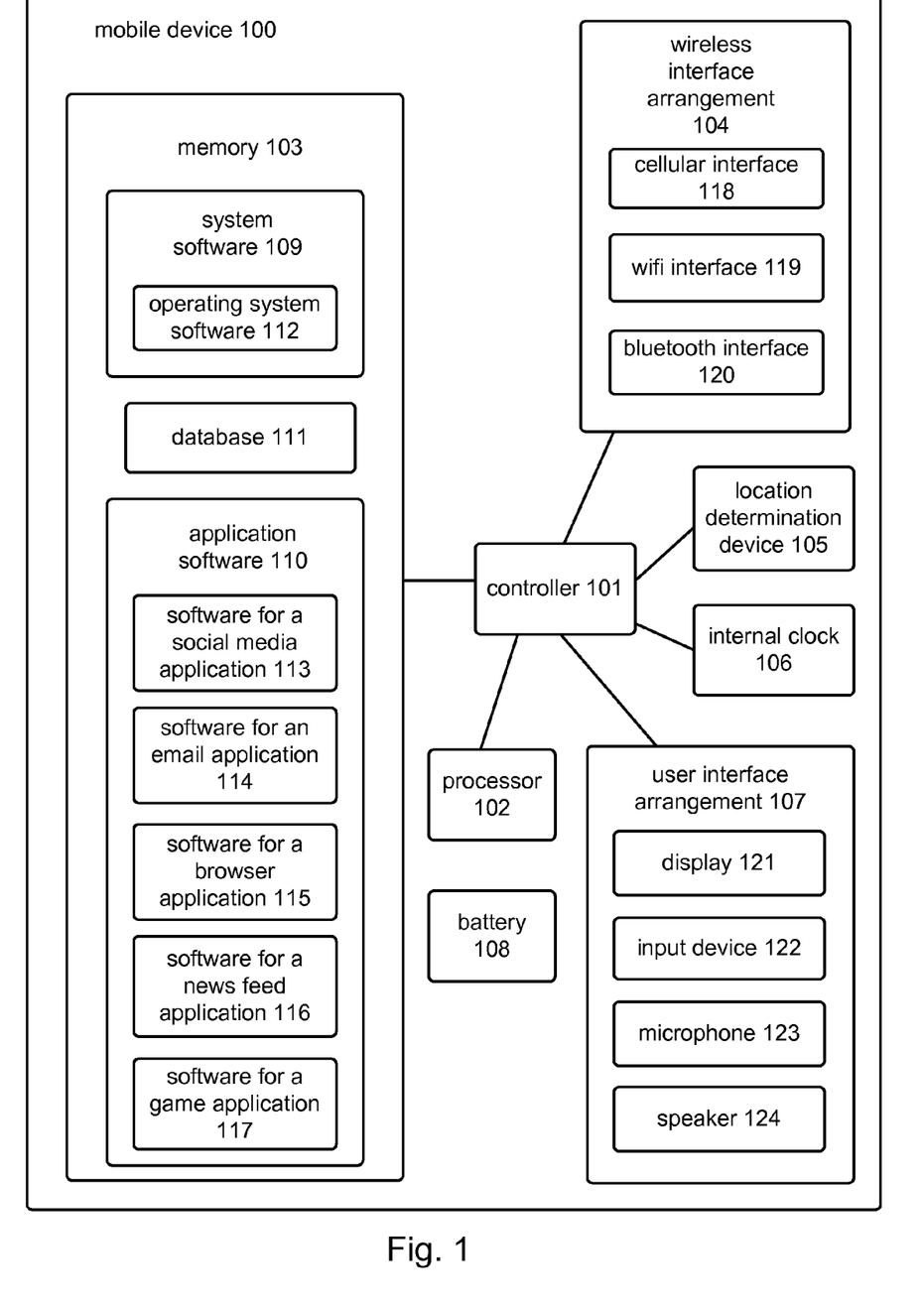
FIG. 1 is a schematic diagram showing components of a mobile device according to and operating according to various aspects of the invention.

With reference to FIG. 1, a schematic diagram of components of a mobile device 100 is shown, comprising a controller 101, a processor 102, a memory 103, a wireless interface arrangement 104, a location determination device 105, an internal clock 106 and a user interface arrangement 107. The mobile device 100 also includes a battery 108. For example, the mobile device 100 may be a smartphone or a tablet computer.

The controller 101 is configured to interface with and control the processor 102, memory 103, wireless interface arrangement 104, location determination device 105, internal clock 106 and user interface arrangement 107. The controller 101 does this according to instructions it fetches from the system software 109 of the memory 103, which is described in more detail below. For example, the mobile device 100 may comprise a central processing unit (CPU), in which case the controller 101 may comprise the control unit (CU) of the CPU.

The processor 102 is configured to perform arithmetic and logical operations demanded of it by the controller 101. For example, the mobile device 100 may comprise a CPU, in which case the processor 102 may comprise a number of arithmetic logic units (ALU) of the CPU.

The memory 103 comprises system software 109, application software 110 and a database 111. The memory 103 may, for example, comprise a combination of integral ROM and RAM and removable Secure Digital (SD) memory.

The system software 109 is read and executed by the controller 101 and therefore dictates the functioning of the controller. The system software 109 comprises operating system software 112 used by the controller 101 to run the operating system of the mobile device 100, through which the controller can run applications from the application software 110. For example, the operating system may be Symbian or Windows Phone.

It should be understood that when herein referring to configured functions of the controller 101, this configuration most likely comprises configuration of the system software 109 which in turn dictates the behaviour of the controller accordingly. Similarly, it should be understood that any computation described as being performed by the controller 101 will most likely be computation performed within the processor 102 under the control of the controller.

The application software 110 comprises software for a social media application 113, software for an email application 114, software for a browser application 115, software for a news feed application 116 and software for a game application 117. Each of these comprise instructions and related data to allow the controller 101 to run the respective application. Each of the applications of the application software 110, when run by the controller 101, require the mobile device 100 to communicate wirelessly. For example, each of the applications may require a wireless communication with a server via the Internet.

The database 111 comprises recorded information on the power consumed by each of the applications when communicating wirelessly via one of the wireless interfaces during previous running of the each of the applications by the controller 101 at a number of different times and locations of the mobile device 100. Furthermore, for each recorded application power consumption, the database 111 also comprises information on the wireless interface and access point used, as well as information on the time of measurement and the location of the device 100. The database 111 will be described in more detail with reference to FIG. 2. Furthermore, the database 111 is populated and updated by the mobile device 100, as will be described with reference to FIGS. 3 and 4.

The wireless interface arrangement 104 comprises a cellular interface 118, a wifi interface 119 and a Bluetooth interface 120. In more detail, the wireless interface arrangement 104 comprises software, which is stored in the memory 103, and hardware necessary for the controller 101 to be able to wirelessly communicate data via certain communication mediums according to certain associated wireless data communication standards. For example, the cellular interface 118 may comprise software and hardware of the wireless interface arrangement 104 which the controller 101 can use to communicate data wirelessly via radio according to one of the Global System for Mobiles (GSM), Universal Mobile Telephone System (UMTS) or Long Term Evolution (LTE) standards. Furthermore, the wifi interface 119 comprises software and hardware configured to enable to the controller 101 to be able to communicate via radio with a wireless local area network (WLAN) using the IEEE 802.11 set of WLAN communication standards.

Hardware of the wireless interfaces may for example comprise suitable antenna and signal processing circuitry. The wireless interfaces of FIG. 1 are shown only by way of example, and embodiments could be implemented on a device comprising other wireless interface technologies or combinations thereof, for instance the mobile device 100 could also comprise a WiMax interface (IEEE 802.16).

The location determination device 105 is configured to provide information on the location, for instance expressed through latitude and longitude, of the device 100. For example, it may comprise a GPS (Global Positioning System) receiver. Alternatively, it may comprise a module that receives information about the location of the mobile device 100. For instance, it may be a software module that reports base stations and other access points from which signals can be detected at the mobile device 100 to a server on a network, and then receive location information back from that server. For convenience, the example of a GPS receiver will be used with reference to the location determination device 105 of FIG. 1 from here on.

The internal clock 106 provides information about a current time to the controller 101.

The user interface arrangement 107 comprises a display 121, an input device 122, a microphone 123 and a speaker 124. For example, the input device 122 may be a keypad and/or it may, together with the display 121, comprise a touch screen of the mobile device 100.

Figure 4:
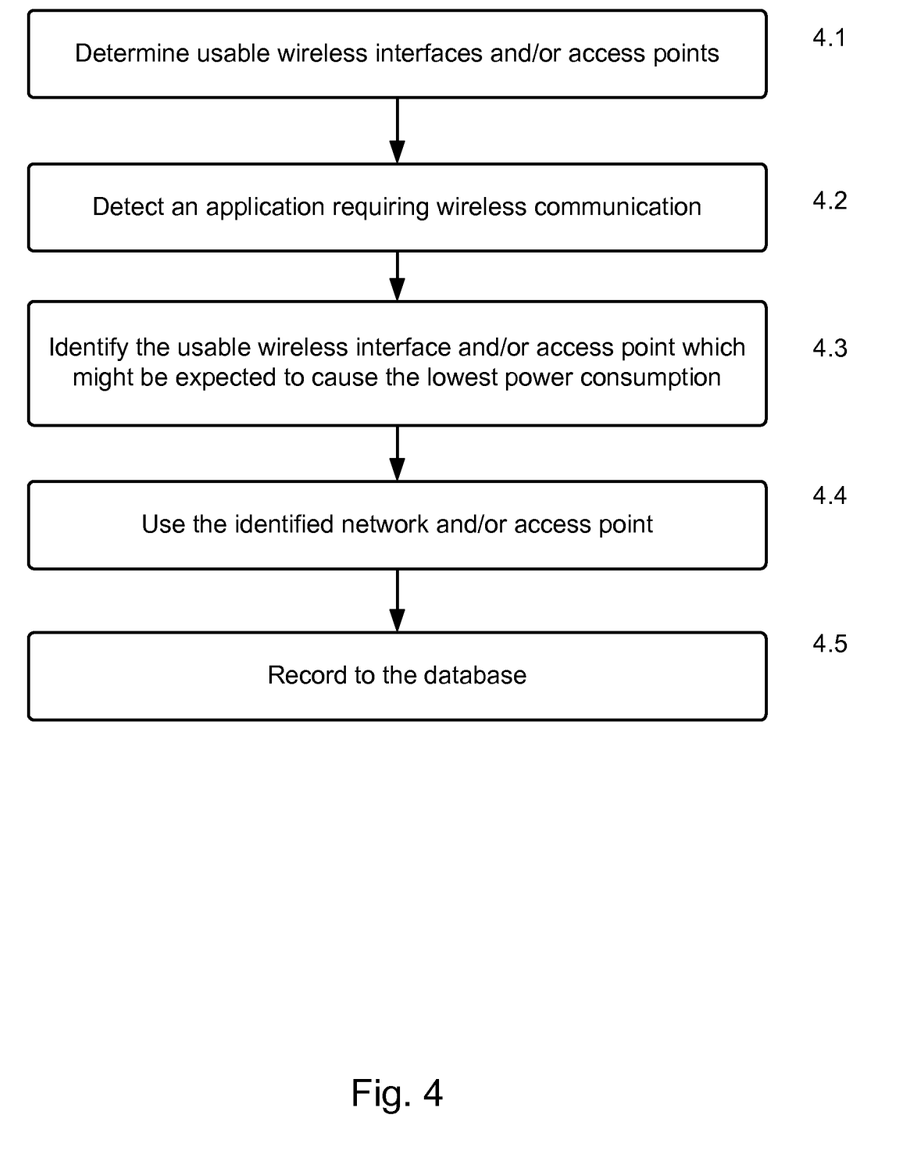
FIG. 4 shows how a wireless connection may be selected and information recorded according to certain aspects of the invention.

When one of the applications is run by the controller 101 and requires wireless communication, the controller is configured to use the information in the database 111 as well as information on the location of the device 100 from the GPS receiver 105 and the time information from the internal clock 106 to identify a usable wireless interface and an available access point which are likely to cause the application to use the least power when communicating wirelessly, as will be described in more detail below with reference to FIG. 4.

Figure 2:
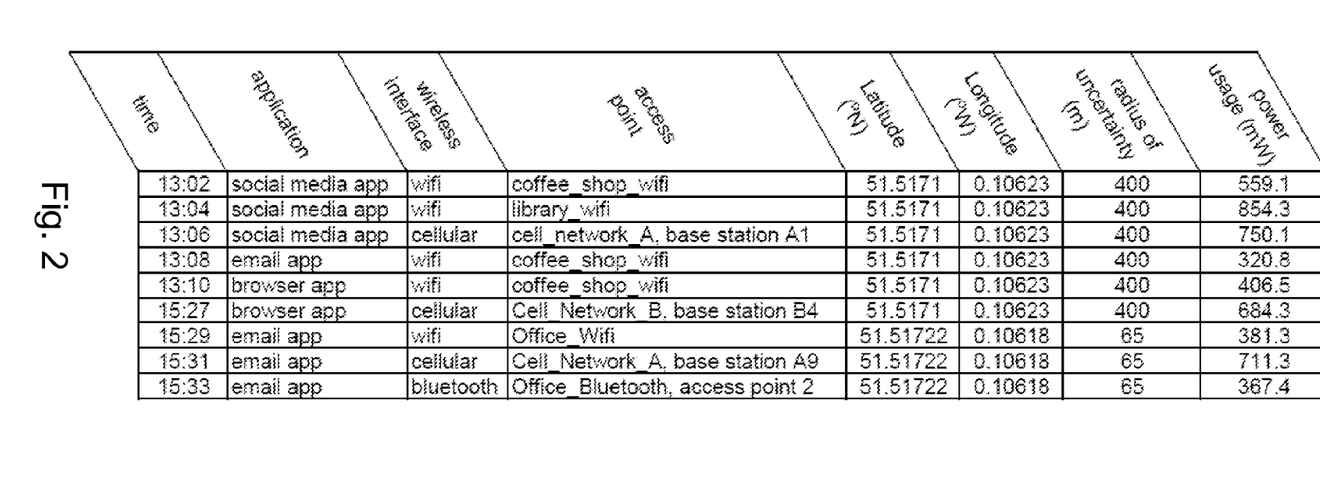
FIG. 2 shows examples of data entries present in the database of FIG. 1.

With reference to FIG. 2, eight example data entries (records) of the database 111 of FIG. 1 are shown. Each data entry comprises a measured power consumption of the application during wireless communication. Each also includes an indicator identifying the application in question. Each also includes indicators identifying the both the wireless interface and the access point used and information on the conditions of the circumstances associated with each entry. The information on the conditions comprises the time of day measured from the internal clock 106 and the latitude and longitude of the device 100 detected by the GPS receiver 105, as well as the radius of uncertainty determined by the GPS receiver 105 (or other location determination device 105) concerning the determined latitude and longitude.

Making a measurement of the power consumption of an application during wireless communication by the application may, for example, comprise the controller 101 using measurement of current drain from the battery whilst the application is running. It will be appreciated that power consumption can be calculated from the current drain having regard to the battery voltage. It will be appreciated also that the current is drawn to power not only the wireless interface but also the processor 102, the display 121, the location determination device 105 and other components, utilisation of all of which is dependent on the running of the operation. Making a measurement may involve ensuring that other applications are running at idle, or alternatively only recording measured power consumption when other applications are running at idle.

As previously mentioned, the database 111 is populated and updated by the device 100 and this process will now be described in more detail with reference to FIGS. 3 and 4.

Figure 3:
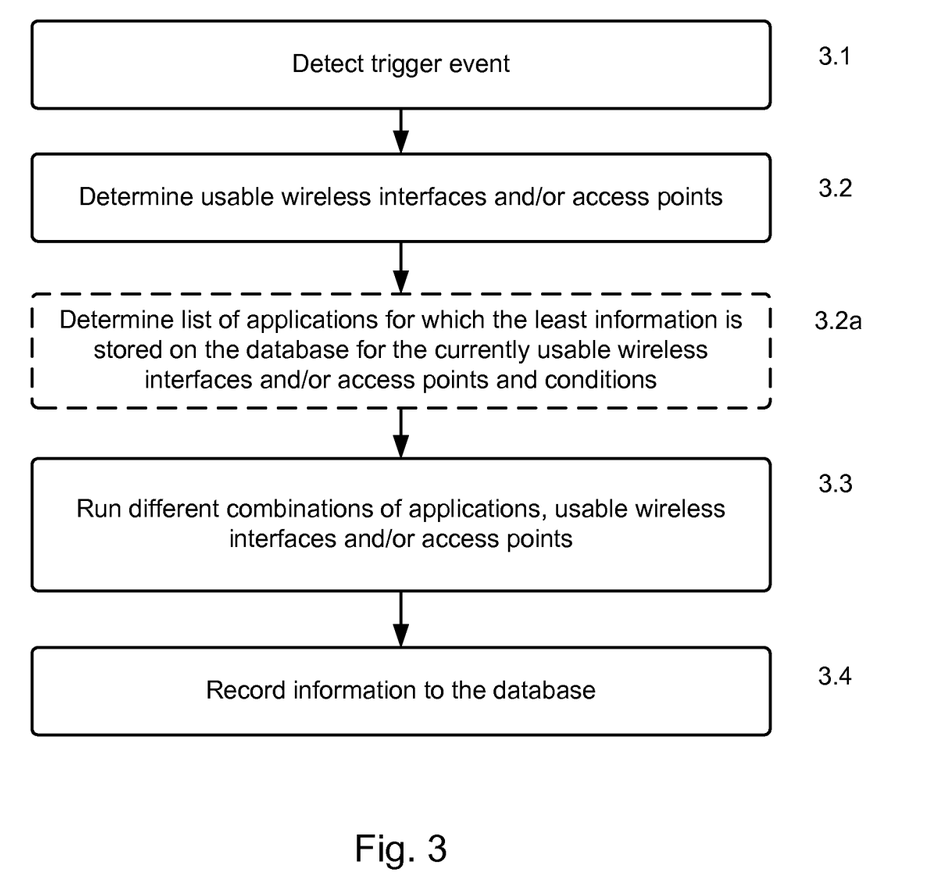
FIG. 3 shows how the database of FIG. 1 may be populated according to certain aspects of the invention.

With reference to FIG. 3, a method by which the device 100 populates the database 111 is as follows.

At step 3.1, the controller 101 detects a trigger event and responds to this by proceeding with the database population process. The controller 101 may be configured to detect and respond to a number of trigger events. For example, the controller 101 may monitor the location of the device 100 and detect when the location has not changed for a period of time, for instance 10 or 30 minutes, and in response to the determination trigger database population. Triggering may be suppressed if database population has been performed at the current location recently (for instance within one or two weeks). In embodiments in which current time is recorded in the database 111, database population may be suppressed if it has already been carried out at a similar time, for instance within one hour, on a different day recently. Triggering may be suppressed also if the device 100 is being used by the user, so as not to affect the user experience. Database population may be performed in response to any other trigger, for instance the connection of the device 100 to a source of charging power or receipt of a user command through the user interface arrangement 107.

At step 3.2, the mobile device 100 monitors the wireless interface arrangement 104 to determine, from detected wireless data communications, the wireless interfaces which can be used and the available access points with which wireless communication could occur with the Internet or other network at the current time.

The controller 101 then executes in turn all the different combinations of applications, currently usable wireless interfaces and available access points at step 3.3. In doing this, the controller 101 allows the communication of data wirelessly by applications for each of the executed combinations before switching to the next combination. Each measurement is performed for a limited period of time, for instance 10 or 20 seconds. During each measurement, the application is controlled to conduct an amount of data communication (both transmit and receive) that is typical for that application. For media streaming applications, data communication use can be quite steady. For applications such as browsers and social media applications, data communication can be irregular. Performing a measurement over a period of time helps to make the measured value representative of actual power consumption in a real situation.

At step 3.4, for each of the combinations executed at step 3.3, the controller 101 measures the power consumption of application during their wireless communication and records this to the database 111 along with an indicator identifying the application in question, an indicator identifying the wireless interface and access point used and information on the current conditions of the circumstances associated with each measurement. The information on the current conditions comprises the time of day measured from the internal clock 106 and the latitude and longitude of the device 100 detected by the GPS receiver 105 as well as the radius of uncertainty determined by the GPS receiver concerning the determined latitude and longitude.

Alternatively, the controller 101 may not run all of the different combinations at step 3.3, but instead only execute a certain number of the different combinations. For example, the population process may for example comprise further optional step 3.2a wherein, following the detection of a trigger event 3.2, the controller 101 determines a list of applications for which the least amount of information is stored on the database 111 concerning the determined usable wireless interfaces, available access points, and current conditions. In this case, step 3.3 comprises executing applications utilising the usable wireless interfaces and available access points according to the list of combinations for which no or little data is available.

Step 3.3 continues until the controller 101 registers an event which signals that it should stop (for instance, the user starts using the device 100), a termination event, or until the database 111 is fully populated for that time and location. Other examples of possible termination events may be a certain low level of power battery power, or an increase 111 processing demand by other applications or systems of the mobile device 100.

If the device 100 is configured to continually monitor for available networks, step 3.2 may be omitted since the information provided by that step would already be available.

With reference to FIG. 4, a method of reducing power consumption of the mobile device 100 by identifying and then using a usable wireless interface and an available access point which might be expected to cause the lowest power consumption, and of updating the database 111, is as follows.

The controller 101 is configured to periodically monitor the wireless interface arrangement 104 to determine, from detected wireless data communications, the wireless interfaces which can be used at any one time and the available access points with which wireless communication could occur. This constitutes the first step in the method, step 4.1.

At step 4.2, the controller 101 detects that an application requires wireless communication and responds to this by proceeding to the next step of the method, step 4.3. For example, the email application may be being run by the controller 101 and may require wireless communication in order to synchronise with an online email service.

The controller 101 then, at step 4.3, uses information on the determined usable wireless interfaces and available access points, information on the application requiring wireless communication and the current conditions, along with information from the database 111, to identify which of the usable wireless interfaces and available access points is likely to cause the lowest power consumption by the application. The information on the current conditions comprise the time determined from the internal clock 106 and the latitude, longitude and radius of uncertainty determined from the GPS receiver 105. The information on the application requiring wireless communication may for example comprise an indicator identifying the application. The information on the usable wireless interfaces and available access points may for example respectively comprise indicators identifying each wireless interface and access point. For brevity, a determined usable wireless interface together with an associated available access point shall from here on, in places, be referred to as an available connection. Furthermore, for brevity, the time and location information of each data entry shall here on, in places, be referred to as the conditional information of the entry.

For example, the controller 101 may search through the database 111 and determine, for each available connection, a data entry corresponding to the application and the available connection in question comprising conditional information which most closely corresponds to the current conditions. The controller 101 may then identify which of the determined data entries includes the lowest measured power consumption value, therefore identifying which of the usable wireless interfaces and available access points is likely to cause the lowest power consumption by the application in the prevailing conditions.

Determining, for each available connection, a data entry, of those identified as corresponding to the application and the available connection, which comprises conditional information which most closely corresponds to the current conditions may, for example, comprise computing a dissimilarity value for each data entry and then identifying the data entry with the lowest dissimilarity value. In more detail, the conditional information of each data entry comprises a number of items of data, namely, a time item, a latitude item, a longitude item and a radius of uncertainty item. The dissimilarity value of each data entry may therefore be calculated by computing a dissimilarity value for each item of conditional information of a data entry and totaling these. Computing a dissimilarity value for each item may comprise calculating the difference between the value of that item and the value of the respective item of the current condition information, using units convenient to that item type, and weighting this with a predetermined weighting factor which is directly proportional to the perceived significance that any difference found in that item type might have on the reliability of the power consumption information of the respective data entry.

Alternatively, the controller 101 may estimate power consumption values of the application for each of the available connections. In which case, identifying which of the available connections is likely to cause the lowest power consumption would comprise the controller 101 selecting the available connection which it has estimated will cause the lowest power consumption.

For example, for each available connection, the controller 101 may search through the database 111 for data entries corresponding to the application and the available connection in question. The controller 101 may then compute the dissimilarity values of each of these data entries as previously described. The controller 101 may then select a number of those data entries having the lowest dissimilarity values and estimate the power consumption of the application by taking a weighted mean of the power consumption value of each of these data entries using an inverse of their respective dissimilarity values as weighting factors.

Alternatively, for example, the controller 101 may perform statistical analysis and/or be configured to use machine learning techniques using the information on the database 111 to estimate a power consumption value for each of the available connections. For example, the controller 101 may use a mathematical classifier algorithm, using the database 111 as a training set, to estimate a power consumption value for each of the available connections.

At step 4.4, the controller 101 then utilises the identified wireless interface and access point for wireless communication by the application in question.

At step 4.5, the controller 101 measures power consumption of the application during its wireless communication and records this to the database 111 along with an indicator identifying the application in question, an indicator identifying the wireless interface and access point used and information on the current conditions of the circumstances associated with each measurement. For example, the controller 101 may measure the power consumption of the application and record this along with the accompanying information during the wireless communication by the application.

The controller 101, at step 4.5, therefore provides the database 111 with updated information concerning the application in question, for the utilised wireless interface and access point, for the current conditions.

The determining of available networks, step 4.1, may alternatively be performed after the detection of an application requiring wireless communication, step 4.2. This may reduce power consumption but at the cost of an increased time to perform the method of FIG. 4.

Moreover, although the above embodiment has been described as utilising conditional information comprising time and location information determined by the device 100 for recording to the database 111 and for comparing with recordings on the database in, other types or combinations of conditional information can alternatively be used. For example, the conditional information utilised by the device 100 according to the methods described could also comprise any or all of information on the user of the device 100, quality of service information, for instance signal power (in dBm) of an access point, and the number of other applications running. However, for every additional item of conditional information used for the methods described, the processing involved, for instance in the identifying of a usable wireless interface and/or available access point at step 4.3 of FIG. 4, increases. Conversely, in other embodiments, the invention is implemented on a device 100 making use of only location information (i.e. time is not recorded nor considered).

By implementing the above-described methods, power consumption of the device 100 may be reduced. Moreover, because the database 111 is populated by the device 100, this may be achieved in a way that is accurate with regard to the actual device 100 (including the specific chipsets that it uses for wireless communication) and in the particular conditions in which the device can be found.

By triggering population of the database 111 when the location of the device 100 has been unchanged for a period of time, the database 111 can be populated with power consumption measurements for locations where the user spends time. This may include locations such as 'home', 'at friend's house' and 'at the office'. It may also include more specific locations such as 'my office', 'the office canteen', 'my boss's office', 'meeting room 1' etc. In such specific locations, the same access points of a network, e.g. a WLAN network, may be available. However, because of the distance between the locations and the access points, the path through which signals have to propagate and possibly also interference, the access point that provides the lowest power consumption for wireless communication by an application may vary between locations that are not distant from one another. By recording location in the database 111 and using the location of the device 100 to determine a connection having the lowest power consumption, power consumption can be reduced considerably compared to simply choosing an access point or network based on some assumed power consumption.

Moreover, by measuring power consumption of an application-by-application basis, power consumption can be further reduced. This is because the power consumption of the device 100 when running on an application depends on the nature of the requiring of data by the application and the characteristics of communication by different wireless interfaces.

For instance, media streaming applications use wireless data resources relatively evenly, in the sense that the data rate is about constant when data is being streamed. Browser applications, however, use wireless data resources in a more bursty way, alternating between downloading data at the maximum available rate to downloading no data. Wireless interfaces that do not require resource negotiation or reconnection when resuming data communication thus use less power with applications that use data in a bursty way, all other factors being equal.

Furthermore, different applications have different transmit and receive data requirements. For instance, a gaming application relating to a multi-player game, for instance a role playing game or shooting game, requires considerable uplink data communication as well as downlink communication, but media streaming applications are strongly biased to downlink communications. Multi-player game applications thus use less power when communicating with an interface that has more efficient uplink communication, all other factors being equal.

By recording time of day in the database 111 and using the time of day to determine a connection for use having the lowest power consumption, power consumption can be reduced. This is because the time of day can be an indicator of network utilisation, which can have an effect of power consumption of the device 100 when communicating wirelessly. For instance, in morning and evening rush hours data links of cellular networks are busier than at other times of day. Since busyness has an effect on the power consumption in networks that use CDMA protocols, the time of day can have an effect on power consumption, all other factors being equal, and using the time of day can improve the effectiveness of the method to minimise power consumption.

Although in the above description the mobile device 100 has been described as having multiple wireless interfaces and of determining, recording and selecting available access points, other embodiments are possible.

For example, the mobile device 100 may comprise only one wireless interface. In these embodiments, the mobile device may minimise power consumption of wireless data communication of applications of the device 100 by using the methods described to identify for each application an access point out of a number of determined available access points, accessible by the single wireless interface, which is likely to cause the lowest power consumption by the device 100 when running the application.

In other embodiments, the mobile device 100 does not record information on access points at all. In these embodiments, the mobile device may minimise power consumption of wireless data communication of applications of the device 100 by using the methods described to identify for each application a wireless interface, out of a number of determined available wireless interfaces, which is likely to cause the lowest power consumption by the device 100 when running the application.

Although the methods of FIGS. 3 and 4 have been described as being carried out by the controller 101, and it has been explained that such functionality of the controller is likely to be derived from system software 109 stored in the memory 103 accessed and executed by the controller, the methods of FIGS. 3 and 4 could alternatively be implemented in an application of a device 100. In these embodiments, appropriate application software, when run by the controller 101, carries out the methods of the invention. In other words, a user could launch the application on the device 100 which would work to reduce power consumption of other applications of the device when those applications tried to communicate data wirelessly. The application may be downloaded from an online store, or may be carried to the device 100 on a removable medium, such as an integrated circuit memory card.

It should also be understood that other methods of determining the usable wireless interfaces and available access points as described with respect to steps 3.2 and 4.1 of the methods of FIGS. 3 and 4 respectively are possible. For example, this may be done by the controller 101 comparing determined current conditions with information on the database 111 to determine which wireless networks are likely to be usable and/or which access points are likely to be available at that time and location of the mobile device 100.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
controlling a mobile device comprising: one or more wireless interfaces, one or more applications that require the mobile device to communicate wirelessly, and a database, to perform:
measuring power consumption during wireless communication in each of a plurality of circumstances in which one or more conditions are present for plural combinations of:
the one or more applications, and
the one or more wireless interfaces and/or available access points;
for each measurement of power consumption, recording in the database the measured power consumption along with: information on the associated one or more conditions, and indicators identifying the one of the one or more applications and the one of the one or more wireless interfaces and/or access points;
detecting a requirement of a first one of the one or more applications for wireless communication;
utilizing the database and information on current conditions to identify the wireless interface and/or access point that might be expected to cause the lowest power consumption; and
using the identified interface and/or access point to allow the first application to communicate wirelessly.

2. The method according to claim 1, wherein the measuring power consumption comprises measuring power consumption of each of plural more applications.

3. The method according to claim 1, wherein the one or more conditions include location.

4. The method according to claim 1, wherein the one or more conditions include time of day.

5. The method according to claim 1, wherein the measuring power consumption during wireless communication in each of the plurality of circumstances in which one or more conditions are present in response to a trigger condition.

6. The method as claimed in claim 1, wherein the utilizing the database and information on current conditions to identify the wireless interface and/or access point that might be expected to cause the lowest power consumption comprises:
searching through the database and determining, for each available wireless interface and/or access point, a data entry corresponding to the application and the wireless interface and/or access point having conditional information which most closely corresponds to the current conditions; and
identifying which of the determined data entries includes the lowest measured power consumption value.

7. The method as claimed in claim 6, wherein the searching through the database and determining, for each available wireless interface and/or access point, a data entry corresponding to the application and the wireless interface and/or access point having conditional information which most closely corresponds to the current conditions comprises, for each available wireless interface and/or access point:
computing a dissimilarity value for each of a plurality of data entries which correspond to the application and the wireless interface and/or access point; and
identifying the data entry with the lowest dissimilarity value.

8. The method as claimed in a claim 1, wherein the utilizing the database and information on current conditions to identify the wireless interface and/or access point that might be expected to cause the lowest power consumption comprises, for each available wireless interface and/or access point:
searching through the database and determining a plurality of data entries corresponding to the application and the wireless interface and/or access point;
computing a dissimilarity value for each of the plurality of data entries; and
taking a weighted mean of the power consumption value of each of the plurality of data entries using an inverse of their respective dissimilarity values as weighting factor.

9. The method according to claim 1, wherein the method is executed by a mobile device.

10. The method according to claim 1, wherein the method is executed by a computing apparatus.

11. An apparatus comprising at least one processor and at least one memory including computer program code, the at least one memory and the computer program code configured to, with the at least one processor, cause the apparatus:
to control a mobile device comprising one or more wireless interfaces, one or more applications that require the mobile device to communicate wirelessly, and a database:
to measure power consumption during wireless communication in each of a plurality of circumstances in which one or more conditions are present for plural combinations of the one or more applications and the one or more wireless interfaces and/or available access points;
for each measurement of power consumption, to record in the database the measured power consumption along with: information on the associated one or more conditions, and indicators identifying the one of the one or more applications and the one of the one or more wireless interfaces and/or access points;
to detect a requirement of a first one of the one or more applications for wireless communication;
to utilize the database and information on current conditions to identify the wireless interface and/or access point that might be expected to cause the lowest power consumption; and
to use the identified interface and/or access point to allow the first application to communicate wirelessly.

12. The apparatus of claim 11, wherein the at least one memory and the computer program code are configured, with the at least one processor, to cause the apparatus to measure power consumption by causing the apparatus to measure the power consumption of each of plural more applications.

13. The apparatus of claim 11, wherein the one or more conditions include location.

14. The apparatus of claim 11, wherein the one or more conditions include time of day.

15. The apparatus of claim 11, wherein the at least one memory and the computer program code are configured, with the at least one processor, to cause the apparatus:

to measure power consumption during wireless communication in each of a plurality of circumstances in which one or more conditions are present in response to a trigger condition.

16. The apparatus of claim 11, wherein the at least one memory and the computer program code are configured, with the at least one processor, to cause the apparatus to utilize the database and information on current conditions to identify the wireless interface and/or access point that might be expected to cause the lowest power consumption comprises by causing the apparatus:
   to search through the database and determining, for each available wireless interface and/or access point, a data entry corresponding to the application and the wireless interface and/or access point having conditional information which most closely corresponds to the current conditions; and
   to identify which of the determined data entries includes the lowest measured power consumption value.

17. The apparatus of claim 16, wherein the at least one memory and the computer program code are configured, with the at least one processor, to cause the apparatus to search through the database and determining, for each available wireless interface and/or access point, a data entry corresponding to the application and the wireless interface and/or access point having conditional information which most closely corresponds to the current conditions by causing the apparatus, for each available wireless interface and/or access point:
   to compute a dissimilarity value for each of a plurality of data entries which correspond to the application and the wireless interface and/or access point; and
   to identify the data entry with the lowest dissimilarity value.

18. The apparatus of claim 11, wherein the at least one memory and the computer program code are configured, with the at least one processor, to cause the apparatus to utilize the database and information on current conditions to identify the wireless interface and/or access point that might be expected to cause the lowest power consumption by causing the apparatus, for each available wireless interface and/or access point:
   to search through the database and determining a plurality of data entries corresponding to the application and the wireless interface and/or access point;
   to compute a dissimilarity value for each of the plurality of data entries; and
   to take a weighted mean of the power consumption value of each of the plurality of data entries using an inverse of their respective dissimilarity values as weighting factor.

19. The apparatus of claim 11 being part of a mobile device, the mobile device further comprising: one or more wireless interfaces;
   one or more applications that require the mobile device to communicate wirelessly; and
   a database.

20. A non-transitory computer-readable medium having computer readable instructions stored thereon, the computer readable instructions, when executed by at least one processor, causing the at least one processor:
   to control a mobile device comprising one or more wireless interfaces, one or more applications that require the mobile device to communicate wirelessly, and a database:
      to measure power consumption during wireless communication in each of a plurality of circumstances in which one or more conditions are present for plural combinations of the one or more applications and the one or more wireless interfaces and/or available access points;
      for each measurement of power consumption, to record in the database the measured power consumption along with: information on the associated one or more conditions, and indicators identifying the one of the one or more applications and the one of the one or more wireless interfaces and/or access points;
      to detect a requirement of a first one of the one or more applications for wireless communication;
      to utilize the database and information on current conditions to identify the wireless interface and/or access point that might be expected to cause the lowest power consumption; and
      to use the identified interface and/or access point to allow the first application to communicate wirelessly.

* * * * *